United States Patent [19]

Peters et al.

[11] Patent Number: 5,769,961
[45] Date of Patent: Jun. 23, 1998

[54] REMEDIATION OF ARSENIC-CONTAMINATED SOILS AND GROUNDWATERS

[75] Inventors: Robert W. Peters, Naperville; James R. Frank, Glen Ellyn, both of Ill.; Xiandong Feng, West Richland, Wash.

[73] Assignee: The University of Chicago, Chicago, Ill.

[21] Appl. No.: 442,323

[22] Filed: May 16, 1995

[51] Int. Cl.$^6$ .............................. B08B 3/08; B01D 11/02; B01D 11/04

[52] U.S. Cl. ...................... 134/25.1; 210/634; 210/702; 210/747; 210/912; 134/28; 588/256

[58] Field of Search .................................. 210/634, 747, 210/911, 912, 638, 639, 702, 806, 688; 134/25.1, 28; 405/128, 129; 588/256

[56] References Cited

U.S. PATENT DOCUMENTS

| | | |
|---|---|---|
| 3,070,162 | 12/1962 | Barnard . |
| 4,166,709 | 9/1979 | Valiga . |
| 4,329,179 | 5/1982 | Kutta . |
| 4,489,046 | 12/1984 | Peterson et al. . |
| 5,154,836 | 10/1992 | Clough ..................................... 210/747 |
| 5,202,033 | 4/1993 | Stanforth et al. . |
| 5,252,003 | 10/1993 | McGahan . |
| 5,259,975 | 11/1993 | Mohn . |
| 5,263,795 | 11/1993 | Corey et al. .............................. 405/128 |
| 5,264,135 | 11/1993 | Mohn . |
| 5,324,433 | 6/1994 | Grant et al. .............................. 210/747 |
| 5,342,449 | 8/1994 | Holbein et al. .......................... 134/25.1 |

OTHER PUBLICATIONS

Peters, R.W., C.D. Montemagno, L. Shem, and B.–A. Lewis, 1992. "Surfactant Screening of Diesel–Contaminated Soil", Haz. Waste & Haz. Mater., 9(2): 113–133.

Peters, R.W., C.D. Montemagno, L. Shem, and B.–A.G. Lewis, 1992. "Surfactant Flooding of Diesel–Fuel Contaminated Soil", pp. 85–98 in Environmental Remediation: Removing Organic and Metal Ion Pollutants, ACS Sympos. Series No. 509, G.F. Vandegrift, D.T. Reed, and I.R. Tasker, Eds., Am. Chem. Soc., Washington, D.C.

Peters, R.W., and L. Shem, 1992. "Use of Chelating Agents for Remediation of Heavy Metal Contaminated Soil", pp. 70–84 in Environmental Remediation: Removing Organic and Metal Ion Pollutants, ACS Sympos. Series No. 509, G.F. Vandegrift, D.T. Reed, and I.R. Tasker, Eds., Am. Chem. Soc., Washington, D.C.

Peters, R.W., and L. Shem, 1992. "Adsorption/Desorption Characteristics of Lead on Various Types of Soil", Environ. Prog., 11(3):234–240.

Peters, R.W., and L. Shem, 1992. "Adsorption/Desorption Characteristics of Lead on Various Types of Soil", Proc. 24th Mid–Atlantic Indus. Waste Conf., 24:718–730, (Jul. 14–17, 1992).

Peters, R.W., and L. Shem, 1992. "Remediation of Lead–Contaminated Soils", pp. 5–15 to 5–22 in Proc. Symposium on Energy, Environment, and Information Management, Argonne National Laboratory, Argonne, IL, (Sep. 15–18).

Peters, R.W., G. Miller, and M.D. Brewster, 1994. "Extended Abstract—Desorption of Arsenic from Contaminated Soils Using Chelant Extraction: Batch Feasibility Studies", pp. 429–432 in Proc. Emerging Technologies in Hazardous Waste Management VI, Am. Chem. Soc., Atlanta, GA, (Sep. 19–21).

Brewster, M.D., R.W. Peters, G.A. Miller, T.L. Patton, and L.E. Martino, 1994. "Chelant Extraction and REDOX Manipulation for Mobilization of Heavy Metals from Contaminated Soils", Paper presented at the Institute of Gas Technology Conference in Gas, Oil, and Coal Biotechnology, Colorado Springs, CO, (Dec. 12–14).

*Primary Examiner*—Joseph W. Drodge
*Attorney, Agent, or Firm*—Foley & Lardner

[57] ABSTRACT

An in situ method for extraction of arsenic contaminants from a soil medium and remediation of the medium including contacting the medium with an extractant solution, directing the solution within and through the medium, and collecting the solution and contaminants. The method can also be used for arsenate and/or arsenite removal.

19 Claims, 5 Drawing Sheets

REMEDIATION OF ARSENIC-CONTAMINATED SOILS AND GROUNDWATERS

The United States Government has rights in this invention pursuant to Contract No. W-31-109-ENG-38 between the U.S. Department of Energy (DOE) and the University of Chicago representing Argonne National Laboratory.

BACKGROUND OF THE INVENTION

The present invention relates generally to the in-place removal of arsenic-based contaminants from a soil medium and, in particular, to an integrated in situ method for remediation of arsenic-contaminated soils and associated groundwaters. Arsenic compounds have been used for many years in paint pigments, dyes and printing, insecticides/rodenticides/herbicides, wood preservatives and hide preservatives; and arsenic is a common element in ash ponds. Such compounds and their residues are known toxins and, for this reason, arsenic is one of several commonly occurring elements designated as a priority pollutant by the U.S. EPA under the Clean Water Act.

Arsenic trioxide ($As_2O_3$) has been applied as a herbicide at a number of utility sites, resulting in contaminated soils and groundwaters from applications of this weed killer. Arsenic trioxide is a suspected carcinogen and is highly toxic by ingestion or dust inhalation. The Maximum Contaminant Level (MCL) allowable in drinking water supplies in 0.050 mg/L. In a recent study, arsenic was described as being "at the forefront" of liver, lung, kidney and bladder cancer risks; and the arsenic drinking water standard is anticipated to be set at a near-zero level Waterweek, 1992 *New Research Sure to Drive Arsenic Standard Down, Costs Up*, Waterweek, 1(3). By way of comparison, data has been collected from a number of utility sites described above. Generally, arsenic concentrations range up to 3500 ppm in the soil, with one value of 8300 ppm observed. Arsenic concentrations in the groundwaters range from BDL (below detectable limits) to 15 ppm. In most cases, when the arsenic concentration exceeds the MCL, the values are within a range of 3 to 0.06 ppm.

For these and other reasons, the removal of arsenic contaminants has been an ongoing concern in the art. Common methods of treatment typically involve excavating the contaminated soil/material and treating it with a solidifying agent such as cement. However, such treatment is costly and results in a large net-volume increase of disposable material. In any event, there is evidence to suggest that such treatments are not entirely effective in preventing leaching. See, Immobilization Mechanisms in Solidifications/Stabilization of Cd and Pb Salts using Portland Cement Fixing Agents, Cartledge, et. al. Environ. Sci. Technol., 1990, Vol. 24, No. 6, pp. 867–873. Other methods include washing the effected soil or waste with a solution, then collecting the leachate for removal and disposal. However, such methods typically result in a collection of concentrated heavy metals which may themselves be hazardous.

In addition to the solidification technique described above, leaching can be controlled to some extent by vitrification. Other known methods involve incineration and/or chemical oxidation, followed by co-precipitation and stabilization. Inherent in these techniques are the need for large volumes of water to contain oxidized arsenic compounds, which are then co-precipitated with iron salts and stabilized with dolomitic lime. These and other methods for controlling arsenic leaching, along with their associated advantages and drawbacks, are described in 55 Fed. Reg. 100, pp. 22556–61 (Jun. 1, 1990), which is incorporated herein in its entirety.

U.S. Pat. No. 5,202,033 describes an in situ method for in-place treatment for leachable materials, including arsenic. The invention discloses steps of introducing additives into the waste or soil medium which immobilize the heavy metals by chemical reaction and precipitation in the soil or waste. The treatment is accomplished by adding materials containing phosphates or carbonates of greater solubility than the heavy metal/arsenic phosphate or carbonate formed through the treatment. The phosphate— or carbonate—containing materials form insoluble phosphate or carbonate salts with the heavy metals in the soil or wastes such that the heavy metals will not leach out at unacceptable levels into the environment. The utility of such a treatment/method, however, is burdened in that the heavy metal and/or arsenic—although chemically modified—remains within the soil and is subject to unknown or unforeseen environmental forces which may later reverse the modification and induce leaching.

A similar method is described in U.S. Pat. No. 5,252,003—in particular, a method for the treatment of particulate materials such as soil or sludges, or arsenic-contaminated soil or sludges through reacting the arsenic contaminants with a source of iron (III) ions and a source of magnesium (II) ion. In such a manner, any arsenic contaminant is stabilized in situ to minimize leaching potential. Alternatively, the iron/magnesium stabilization may be conducted after excavation.

As mentioned above, existing methods of arsenic removal involving coagulation/precipitation with lime, alum or ferric sulfate are costly, produce a wet bulky sludge and often require final filters for polishing. Other technologies which have been investigated include ion exchange, foam flotation and adsorption (onto activated carbon and activated alumina). These technologies, while advantageous in some respects, are disadvantaged by requiring, inter alia, soil excavation.

OBJECTS OF THE INVENTION

It is, therefore, an object of this invention to provide a method for removal of arsenic contaminants from a soil or related medium and/or to reduce the volume of the contaminated medium, overcoming the problems of the prior art, including those described above.

Alternatively, it is an object of this invention to provide a method for removal and/or desorption of arsenate contaminants from a soil or related medium and/or to reduce the volume of the contaminated medium, overcoming the problems of the prior art, including those described above.

Alternatively, it is an object of this invention to provide a method for simultaneous removal and/or desorption of both arsenite and arsenate contaminants from a soil or related medium and/or to reduce the volume of the contaminated medium, overcoming the problems of the prior art, including those described above.

It is an object of this invention to provide an in situ method for the removal, mobilization, and/or desorption of arsenic contaminants without excavation of a soil medium.

It is also an object of this invention to adapt, manipulate, and/or modify the chemistry of arsenic and its various oxidation states to effect removal or extraction of such contaminants from a soil medium and/or associated groundwater source.

Other objects, features and advantages of the present method will be readily apparent from the following invention summary and description of preferred embodiments thereof, taken in conjunction with the accompanying examples and figures.

BRIEF DESCRIPTION OF THE DRAWINGS

FIG. 1A (□$H_2O$, +Cit, •TEA, ▲$K_2HPO_4$, x Oxalate, ▼$H_3PO_4$) and FIG. 1B (+PSVS, •Wit-1206, ▲Wit-100, x Wit-D5-10, ▼Cit, □$H_2O$);

FIG. 2A (□$H_2O$, +Cit, •TEA, ▲$K_2HPO_4$, x Oxalate, ▼$H_3PO_4$) and FIG. 2B (+PSVS, •Wit-1206, ▲Wit-100, x Wit-D5-10, ▼Cit, □$H_2O$);

FIG. 3A (□$H_2O$, +Cit, •TEA, ▲$K_2HPO_4$, x Oxalate, ▼$H_3PO_4$) and FIG. 3B (+PSVS, •Wit-1206, ▲Wit-100, x Wit-D5-10, ▼Cit, □$H_2O$);

SUMMARY OF THE INVENTION

Figure 1A:
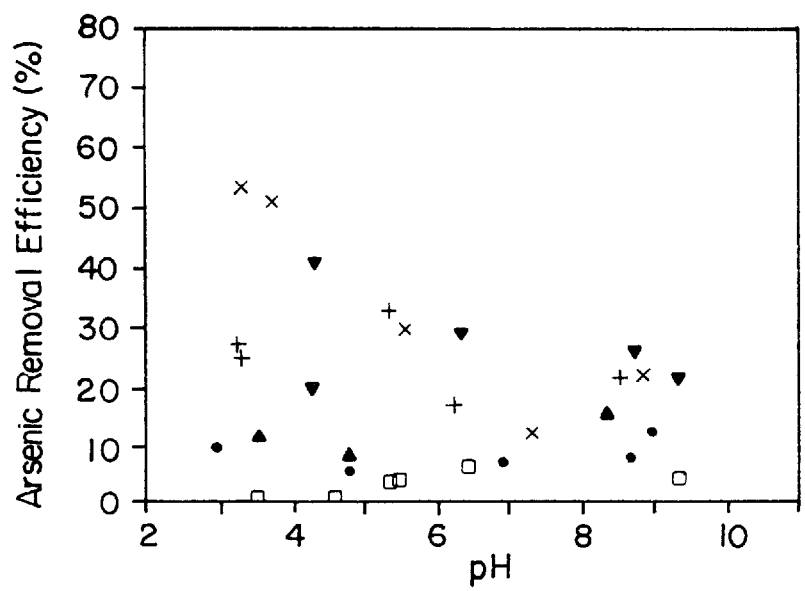
FIGS. 1A and 1B show arsenic removal efficiency (%) from soil sample 1, S1 using selected agents/surfactants, as a function of pH.

This invention is an improved method for removal of arsenic-contaminants and/or an integrated method for remediating soil media and groundwater contaminated with arsenic-based compounds. It overcomes certain well-known problems and deficiencies, including those outlined above, while providing an effective, cost-efficient solution to a wide-spread environmental concern.

In part, the present invention is a method for remediating an arsenic-contaminated soil medium without excavating the soil, including (1) contacting the soil medium with an aqueous extractant solution wherein the extractant is oxalic acid, oxalate anion, phosphoric acid, phosphate anion, citric acid, citrate anion, polyvinylsulfonic acid, polyvinylsulfonate anion or combinations thereof; (2) directing the extractant solution through the soil medium to interact with an arsenic contaminant; and (3) collecting the extractant solution containing the arsenic contaminant.

In preferred embodiments of the present method, the extractant solution has an extractant concentration of about 0.005–0.1M and a pH of about 3–10. The arsenic contaminant includes inorganic arsenates, inorganic arsenites and organic arsenic. In highly preferred embodiments, the extractant is at least one of citric acid and citrate anion.

In part, the present invention is an in situ method for extracting arsenate contaminants from a soil matrix. The method comprises immobilizing an arsenate contaminant through interaction with a solution of at least one of citric acid and citrate anion and collecting the arsenate contaminant with the solution. In preferred methods, the arsenate contaminant is an organic or inorganic compound. Likewise, the solution has an extractant concentration of about 0.005–0.1M and a pH of about 3–10. In highly preferred embodiments, the arsenate contaminant and solution are collected from a groundwater source below the soil matrix.

In part the present invention is a method of in place remediation of soil containing one or more arsenic compounds, including (1) contacting the soil with an extractant solution to mobilize the arsenic compounds, (2) directing the extractant solution through the soil and into a groundwater source below the soil, (3) transferring the groundwater to the soil surface whereby the groundwater contains arsenic compounds and the extractant solution, (4) consolidating the arsenic compounds contained within the transferred groundwater, and (5) stabilizing the consolidated arsenic compounds to minimize leaching during storage.

The arsenic compounds can include an arsenite component which is oxidizable to arsenate. Alternatively, the arsenic compounds are consolidated directly as water insoluble precipitates, without any sort of pre-treatment. Where the arsenate is consolidated with an iron or aluminum precipitating agent, the precipitate is ferric arsenate or aluminum arsenate. Where the arsenic compounds are consolidated through use of oxymetal hydroxides, such as hydrous ferric hydroxide or hydrous aluminum hydroxide, the arsenic compounds can be sorbed thereon.

In preferred embodiments, the consolidated arsenic compounds are stabilized, by solidification or vitrification. Likewise, in preferred embodiments, the extractant is oxalic acid, oxalate anion, phosphoric acid, phosphate anion, citric acid, citrate anion, polyvinylsulfonic acid, polyvinylsulfonate anion or combinations thereof. In highly preferred embodiments, the extractant is least one of citric acid and citrate anion, with the solution thereof having an extractant concentration of about 0.005–0.1M and a pH of about 3–10. Regardless of the extractant or stabilization employed, the remediation method of the present invention can be continuous in nature.

The arsenic extraction or integrated remediation of the present invention includes removal of such contaminants from soil Argonne National Laboratory has performed a number of treatability studies involving soil flushing with surfactants and chelating agents, the purpose of which was to increase the mobilization of the contaminants from the soil matrix. For example, 22 surfactants were screened for their ability to mobilize and/or desorb diesel fuel from a contaminated soil with a high silt/clay content. See, Peters, R. W., C. D. Montemagno, L. Shem, and B. A. Lewis, 1992, *Surfactant Screening og Diesel-Contaminated Soil*, Haz. Waste & Haz. Mater., 9(2):113–136, incorporated herein in its entirety. Anionic surfactants were found to provide the highest degree of diesel fuel mobilization. Removals of the C12 to C19 alkanes approached 80% to 90%. Similarly, various chelating and/or coordination agents have successfully been used to mobilize lead from contaminated soils. See, Peters, R. W., and L. Shem, 1992, *Remediation of Lead-Contaminated Soils*, pp. 5–15 to 5–22 in Proc. Internat. Sympos. on Energy, Environment, and Information Management, Argonne National Laboratory, Argonne, Ill., September 15–18; and Peters, R. W., and L. Shem, 1992, *Adsorption/Desorption Characteristics of Lead on Various Types of Soil*, Environ. Prog., 11(3):234–240; and Peters, R. W., and L. Shem, 1992, *Adsorption/Desorption Behavior of Lead on Various Types of Soil*, Proc. 24th Mid-Atlantic Indus. Waste Conf., 24:718–730, incorporated herein in their entirety. Peters and Shem investigated the use of nitrilotriacetic acid (NTA) and ethylenediaminetetraacetic acid (EDTA) for their efficacy in removing lead from a soil with a high silt/clay content and a soil with a large sand content. Extraction of lead using water alone and NTA were pH sensitive. For the high silt/clay content soil, extraction of lead using water alone removed a maximum of 7.3% at pH~4, while NTA removed nearly 21% of the lead at the same pH condition. For the same soil, EDTA typically removed 54% to 69% over the entire range of initial lead concentrations (ranging from 500 to 10,000 mg/kg) for the pH range of 4 to 11 [Peters and Shem, supra]. For the sandy soil system, removal of lead was typically 90% to 95% over the same pH range. The initial lead content had very little effect on the removal efficiency of lead for the EDTA system. The applied EDTA concentration over the range of 0.01 to 0.1M also had little effect on the removal efficiency of lead from the soil. The concepts and principles of these techniques will be understood by those skilled in the art as applicable to the use of present invention and are to be considered as part of the methods of this invention.

Figure 1B:
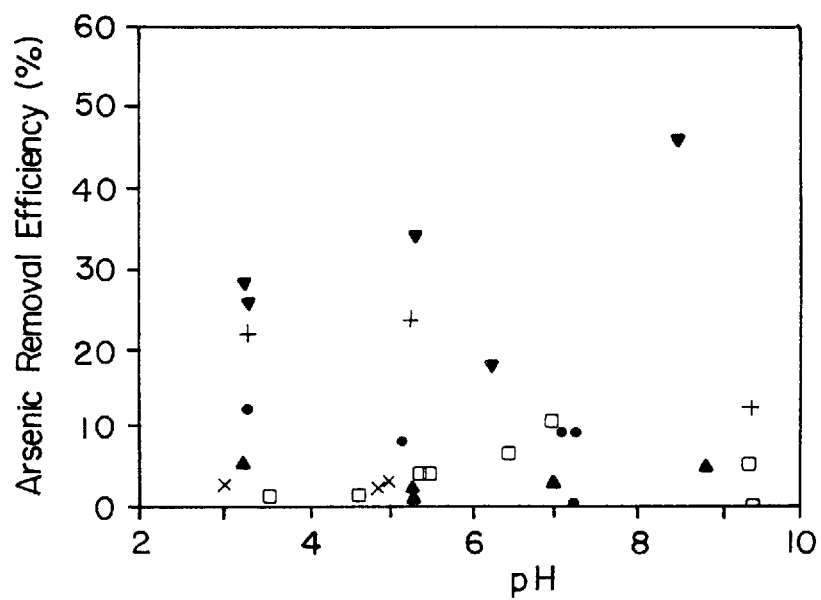
Figure 2A:
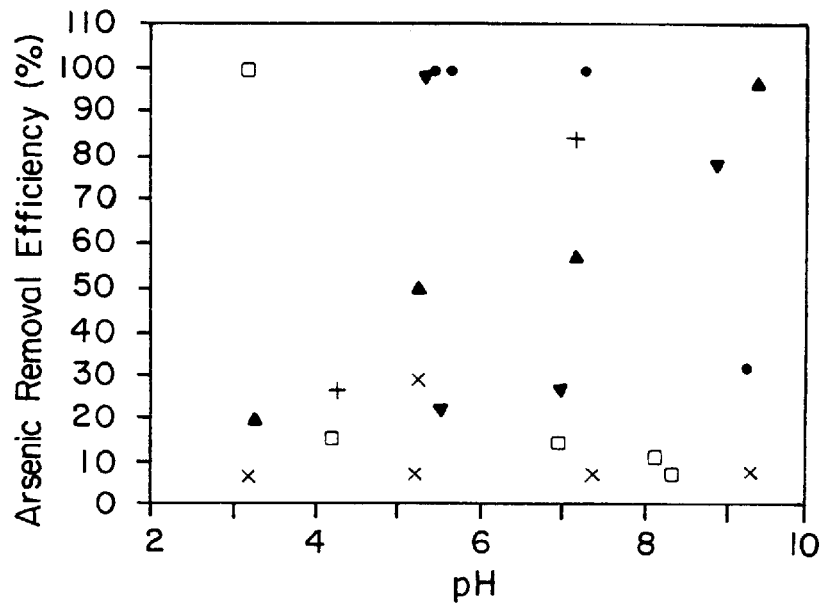
FIGS. 2A and B show arsenic removal efficiency (%) from soil sample 2, S2, using selected agents/surfactants, as a function of pH.
Figure 2B:
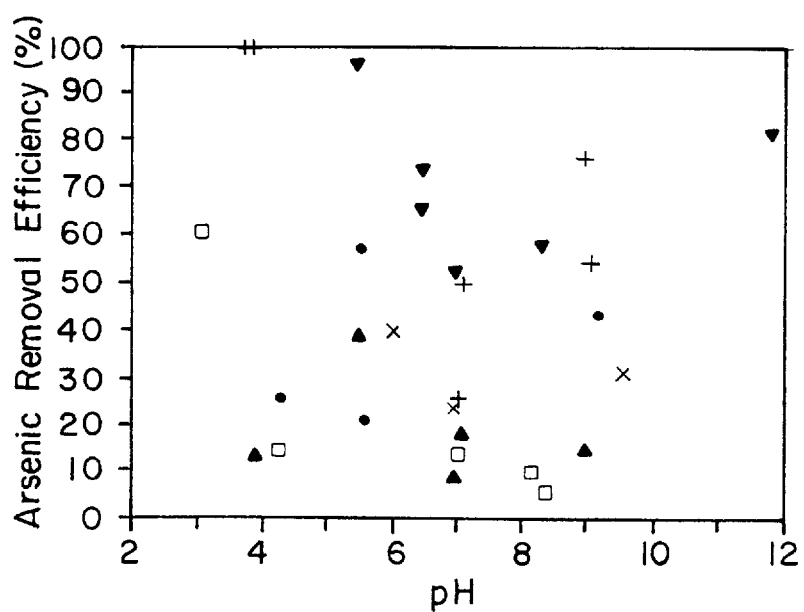
Figure 3A:
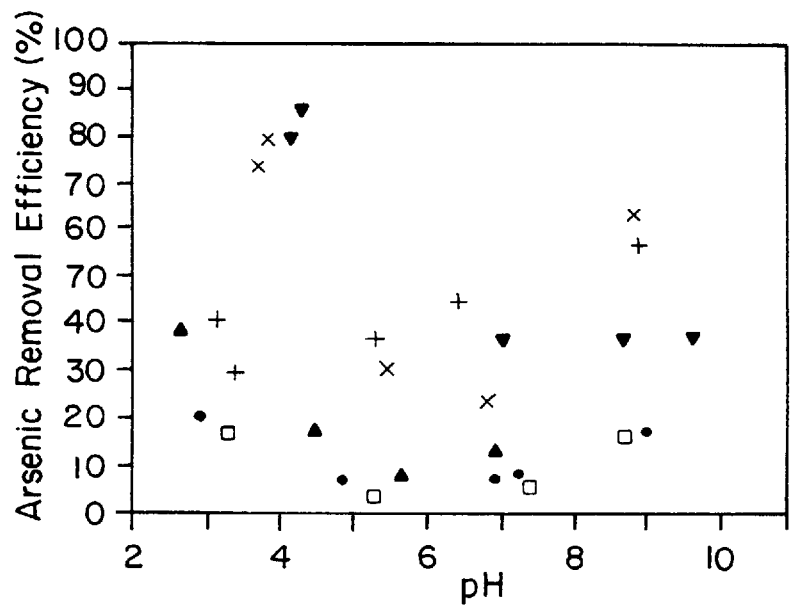
FIGS. 3A and 3B show arsenic removal efficiency (%) from soil sample 3, S3, using selected agents/surfactants, as a function of pH.
Figure 3B:
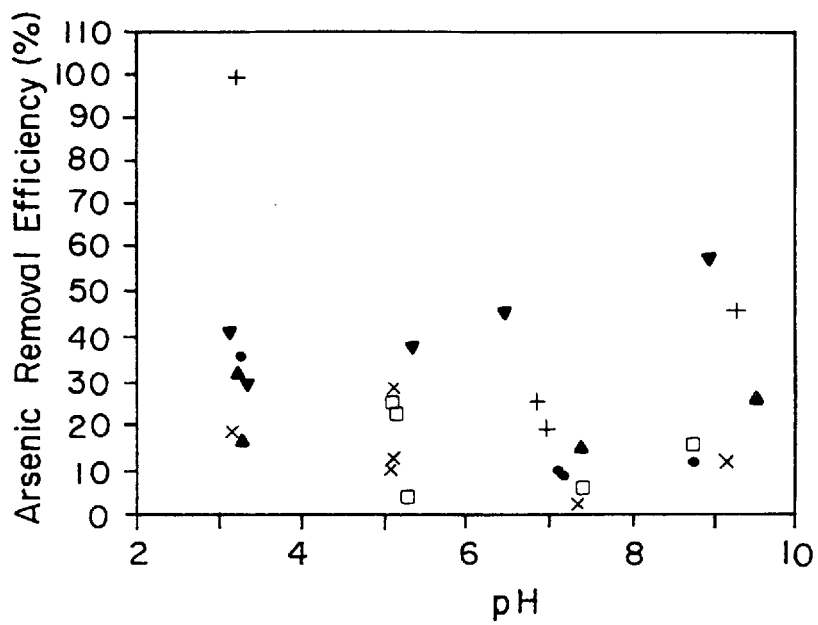

Arsenic has an unusually complex solution chemistry. It is stable in four oxidation states (+5, +3, 0 and −3). Swartzbaugh, J., J. Sturgill, H. D. Williams, and B. Cormier, 1992, *Remediating Sites Contaminated with Heavy Metals,* Haz. Mater. Control, 5(6):36–46, the entirety of which is incorporated herein by reference, indicated that the following information is useful to predict the mobility/desorbability: Eh-pH diagram, solubility, metal mobility in the subsurface, metal mobility in surface waters, pH, Eh and cation exchange capacity. FIG. 1 of Swartzburgh, in particular, shows an Eh-pH diagram for arsenic (total As concentration of $10^{-5}$M) in an aqueous solution containing sulfur (total S concentration of $10^{-3}$M). This figure shows the predominant soluble species and the solids whose solubilities are low enough to occur in this system. Under Eh conditions occurring in oxygenated waters, arsenate species ($H_3AsO_4$, $H_2AsO_4^-$, $HAsO_4^=$, and $AsO_4^{-3}$) are stable. At Eh values characteristic of mildly reducing conditions (which are common for many groundwaters), arsenite species ($H_3AsO_3$, $H_2AsO_3^-$, and $HAsO_3^=$) become stable. The pK values for $H_4AsO_4$ are 2.2, 6.98 and 11.55, and those for $H_3AsO_3$ are 9.22, 12.13 and 13.4. The large value of the pH conditional adsorption constant indicates the potential for amorphous oxymetal hydroxides for use in situations where modest sorbate concentrations are present and low effluent levels are required. See Madgal, S. S., 1990, *A Study of Cationic and Anionic Sorption Equilibrium on a Granular Iron Oxide Adsorbent,* M. S. Thesis, Report No. 90-12, Clarkson University, Potsdam, N.Y. Arsenite and arsenate are typically incorporated within anions such as $As(OH)_4^-$, $AsO_2(OH)^{-2}$, $AsO_3^{-3}$, etc. The predominance of any one species is a function of pH and oxidation-reduction potential. Hydroxides of iron, chromium and aluminum strongly adsorb or form insoluble precipitates with arsenites and arsenates. Sakata, M., 1987, *Relationship between Adsorption of Arsenic (III) and Boron by Soil and Soil Properties,* Environ. Sci. Technol., 21(11):1126–1130, which is incorporated herein in its entirety, observed that adsorption of $As^{+3}$ onto soil was controlled primarily by the consent of amorphous iron oxides and hydroxides with adsorption being a maximum at pH~8. The adsorption coefficient ($K_d$) did not correlate well with soil clay content, cation exchange capacity or total carbon content. Less common forms of arsenic found only under extreme reducing conditions include elemental arsenic (+0) and arsine (−3). The present invention contemplates adaptation of principles of arsenic solution chemistry to soil remediation.

Arsenic has been successfully removed using oxy-iron hydroxide co-precipitation/adsorption. See, Sakata, supra, and Menil, D. T., M. A. Manzione, J. J. Peterson, D. S. Parker, W. Chow, and A. O. Hobbs, 1987 *Field Evaluation of Arsenic and Selenium Removal by Iron Coprecipitation,* J. Water Pollut. Control Fed., 58(1):18–26, incorporated herein in their entirety. Laboratory work by Merrill et al. showed that both arsenate and arsenite are strongly removed by iron co-precipitation.

Many heavy metals can be precipitated by the addition of hydroxide or sulfide ions to form an insoluble metal hydroxide or metal sulfide. Arsenic does not form an insoluble hydroxide. Iron ($Fe^{+3}$) has been shown to form a ferric arsenate precipitate, but not an insoluble iron arsenite. At ambient temperature, the solubility of $FeAsO_4$ leaves a residual of 7.5 mg/L of arsenic in solution, exceeding the MCL for arsenic.

Additional removal mechanisms may be required to bring a wastewater treated with hydroxide or sulfide reagents to meet the MCL standard. By treating at higher levels or iron (or aluminum) addition, hydrous ferric hydroxide (FeOOH) or hydrous aluminum hydroxide (AlMOOH) will form along with the ferric arsenate; this material adsorbs arsenic onto the surface of the oxymetal hydroxide. Hydrous oxides are a class of inorganic compounds, the surfaces of which react with water creating ionizable hydroxyl groups. In addition to the variability of the electrostatic charge (positive, negative or neutral), these groups can chemically interact with a variety of cationic and anionic solutes, both organic and inorganic, binding them to the oxide surface. The solubility characteristics of aluminum oxides preclude their use outside the pH range of 4 to 9; in contrast, iron oxides are chemically stable over a wider pH range (2 to 11). See Merril, supra. Iron oxides are generally available only as fine powders or are generated in aqueous suspension as a hydroxide floc or gel. In such forms, iron (or aluminum) oxyhydroxides retain their desirable sorptive properties for trace substances, but are limited to reactor configurations which incorporate large sedimentation basins or filtration for removal. See, Theis, T. L., 1991, *Project Summary: Development of Oxides of Iron as Sorbents for the Control, Separation, and Recovery of Inorganic Hazardous Waste Components,* New York State Center for Hazardous Waste Management, Buffalo, N.Y., incorporated herein in its entirety.

After forming ferric arsenate (or aluminum arsenate) or any other surface complexes, the remaining arsenic oxyanions can be removed by simple electrostatic attractions. The amorphous oxymetal hydroxide lowers the surface energy either by reducing the total surface area or by adsorbing ions and molecules from the adjacent solution phase. See, Leckie, J. O., M. M. Benjamin, K. Hayes, G. Kaufman, and S. Altmann, 1980, *Adsorption/Coprecipitation of Trace Elements from Water with Iron Oxyhydroxide,* EPRI Project Report No. EPRI CS-1513, Project 910-1, Electric Power Research Institute, Palo Alto, Calif., which is incorporated herein its entirety. Anion adsorption is a mirror image of cation adsorption where, typically, adsorption of metals increases from near zero to nearly 100% as pH increases through a critical range of 1–2 pH units; i.e., anion adsorption increases with decreasing pH. The adsorption of anions is accompanied by the uptake of protons. The location of the pH-adsorption edge depends on the adsorbent concentration, and the system behavior is strongly dependent on the suspended solids concentration. The major factors affecting anion adsorption include solid concentration, solution pH, anion concentration, the presence of competing metalloids or complexing cations, and overall solution composition. See Leckie, supra.

The pH on the sorbent surface strongly affects sorption by affecting the net surface charge on amphoteric sorbents such as hydrous oxides. It also affects the surface speciation and therefore the reactions on the sorbent surface(i.e., ion exchange, hydrolysis, complexation and exchange of $H^+$). Solution pH is one of the primary control parameters affecting solute speciation, the chemical nature of the protolyzable surface species and surface charge. For a protolyzable anion, sorption increases with increasing pH as dissociation increases. However, with increasing pH, the sorbent surface charge of an oxide becomes increasingly negative. At pH values exceeding the $pK_a$ of the anion, sorption decreases. See Madgal, supra.

Typical adsorption curves for arsenate and arsenite show that achievable arsenic removal is approximately 50% greater for the arsenate form as compared to the arsenite form. See, Brewster, M. D., and M. N. Laschinger, 1991, *Arsenic Removal Using Electrochemically Generated Iron in Conjunction with Hydrogen Peroxide Addition,* Proc. 46th Purdue Indus. Waste Conf., 46:339–346, incorporated herein in its entirety. Without restriction to any one theory or mode of operation, Brewster and Laschinger provide two explanations to account for this behavior: (1) ferric arsenate is less soluble than ferric arsenite, and (2) arsenious acid ($As^{+3}$) does not readily lose its proton, which reduces the potential for surface complexations and causes removal to rely almost entirely on electrostatic attractions. As the pH is increased, protons are removed from the complexed oxyanions, according to the reactions:

$$H_2AsO_4^- \rightarrow HAsO_4^{-2} \rightarrow AsO_4^{-3}$$

At elevated pH, the protons dissociate from the arsenate ion. The ability to react with the hydrous ferric oxide (or hydrous aluminum oxide) by displacing a hydroxyl group is reduced. At this point, removal by electrostatic attraction predominates, which accounts for why the iron:arsenic ratio must be increased if a higher final pH is desired. Data on the adsorption of arsenate from solution onto amorphous aluminum hydroxide show it to be at least partially a function of solution pH. See, Anderson, M. A., J. F. Ferguson, and J. Gavis, 1976, *Arsenate Adsorption on Amorphous Aluminum Hydroxide,* J. Colloid & Interface Sci., 54(3):391–399, incorporated herein in its entirety. Data of this sort indicate that the removal of arsenate can be achieved and, under certain conditions, may be maximized at pH<7.

Other anions in solution such as $SO_4^{-2}$, $Cl^-$, and $NO_3^-$, can hinder treatment by directly occupying adsorption sites or orienting around oppositely charged (+) sites, thus preventing arsenate adsorption. By suppressing adsorption, this inhibition prevents complete removal and shifts the adsorption edge. See, Brewster, supra. This effect can be minimized through the addition of an oxidizing agent including but not limited to hydrogen peroxide ($H_2O_2$), to oxidize arsenite to arsenate and $Fe^{+2}$ to $Fe^{+3}$. The hydrogen peroxide serves both to oxidize the ferrous hydroxide ($Fe^{+2}$) to the ferric state ($Fe^{+3}$) and any portion of the arsenic which is in the arsenite state to the arsenate state. Brewster and Laschinger, supra, report that conventional chemical precipitation systems produce good removal efficiencies of arsenic by the addition of iron and/or aluminum reagents, including but not limited to one or more of the following chemicals: ferrous sulfate, ferric sulfate, ferric chloride or aluminum sulfate. They note that the removal efficiency is affected by the influent arsenic concentration, abundance of other dissolved ions, oxidation/reduction potential, final pH, means of clarification and whether or not filtration is used as a polishing step. The oxidation/reduction (REDOX) potential affects the speciation of the chemical constituents in the sorbent, which in turn affects the attenuation of the solutes present; REDOX conditions also influence precipitation. See, Madgal, supra. The concepts and principles of these techniques will be understood by those skilled in the art as applicable to the use of the present invention and are to be considered as part of the methods of this invention.

The present invention also contemplates use of an electrochemical cell to emit ferrous ions. See, Brewster, M. D., 1992, *Removing Arsenic from Contaminated Wastewater Using Electrochemical Iron Addition and Chemical Oxidation,* incorporated herein in its entirety. The effluent from the electrochemical cell is sent to a reactor to which $H_2O_2$ or a similar oxidizing agent is added. The effluent from this reactor is sent to a clarifier to which a polymer flocculent is added to enhance the sedimentation efficiency. The overflow moves through a polishing filter, and the settled solids from the clarifier are sent to a plate-and-frame filter press for dewatering. The filter cake can contain ferric oxide, ferric arsenate, arsenic adsorbed onto the iron matrix and other suspended solids or metals removed by the process. Brewster cited the following advantages associated with this embodiment: (1) the process does not increase the dissolved solids concentration because the treatment can be performed without pH adjustment if the proper iron to arsenate ratio is selected; (2) contrary to other chemical precipitation treatments which involve sulfate or chloride addition as iron or aluminum salts, the process does not increase the dissolved solids concentration because the electrochemical process generates only ferrous and hydroxyl ions, both of which precipitate from solution; (3) the process does not experience interference from competing anions (such as sulfate, chloride and nitrates) since no sulfate or chloride salt addition is involved; (4) the co-precipitated ferric arsenate and arsenic hydrous iron oxide complex are stable under the toxicity characteristics leaching procedure (TCLP) test conditions, resulting in the arsenic concentration being lower than the TCLP regulatory level of 0.05 mg/L; and (5) the process is efficient due to a low residual arsenic concentration, low sludge production rate and low operating costs.

Several technologies such as cement- and lime-based composites, thermoplastic, and organic polymers can be employed to stabilize sludges generated by precipitation of heavy metals. These techniques have been used to successfully minimize the amount of metal leached into the groundwater.

Shively, W., P. Bishop, D. Gress, and T. Brown, 1986, *Leaching Tests of Heavy Metals Stabilized with Portland Cement,* J. Water Pollut. Control Fed., 58(3):234–241, incorporated in its entirety herein, investigated the leaching behavior of various heavy metals stabilized with Portland cement, using the Extraction Procedure (EP) Toxicity test. The arsenite was added as arsenite which did not form a hydroxide precipitate at pH 8.5. The concentrations for four individual metal wastes investigated (in their study) after pH adjustment were: 24,000 mg/L arsenite, 23,000 mg/L cadmium, 24,000 mg/L chromium, and 23,000 mg/L lead. A mixed metal waste was similarly investigated; the metal concentrations were: 3,000 mg/L arsenic, 4,500 mg/L cadmium, 2,080 mg/L chromium, and 8,290 mg/L lead. Acetic acid was added to the ground cement-stabilized wastes in performing the EP toxicity tests. A series of 15 sequential extractions were performed on each stabilized waste. Arsenic was the only heavy metal measured in the liquid leachate during the first three extractions. This was explained by the fact that arsenic is an anion; it is expected to be involved in different reactions than the cationic metals. The material was not considered hazardous because the EP test involved only one extraction; the results indicated that anionic metals were not stabilized as well as cationic metals. Cumulative average metal releases showed that the more soluble metals (arsenite, calcium and cadmium) were extracted in the largest amounts. The behavior was explained by two types of binding mechanisms in the cement paste. First, sorption-precipitation and limited dissolution of the cement matrix limited metal leaching at high pH. Metals dissolved and desorbed as the pH dropped during the second phase of leaching, which resulted in peak releases. Second, metal leaching at pH<6.0 could be limited by diffusion through the solid matrix or slow dissolution of the silicate matrix.

Cheng, K. Y., and P. Bishop, 1992, *Metals Distribution in Solidified/Stabilized Waste Forms after Leaching,* Haz. Wates & Mater., 9(2):163–171, incorporated in its entirety herein, performed a series of leach tests to study the metal distributions in cement-based waste form before and after leaching in acetic acid solutions. Comparing the calculated metal contents in the unleached sample with those in the leached layer, they found that 1% to 10% of the calcium, 15% to 37% of the cadmium, 44% to 79% of the lead, and 75% to 127% of the arsenic remained unleached in the leached layers. Chou, S. T., and L. T. Fan, 1992, *Characteristics of Solidified Samples of Arsenic-Containing Soil: Influence of Acidity,* pp. 493–501 in Proc. Conf. Hazard. Waste Research, Kansas State University, Manhattan, Kans., June 1–2, incorporated herein in its entirety, showed that highly arsenic-contaminated soil could be stabilized and solidified with Class C fly ash to meet the EPA leachability limit of 5.0 mg/L if a sufficient amount of sulfuric acid (~48%) was added to the waste/binder mixture. The concepts and principles of these techniques will be understood by those skilled in the art as applicable to the use of the present invention and are to be considered as part of the methods of this invention.

In situ vitrification (ISV) is an approved technology for treating arsenic-contaminated soil. See, U.S. Environmental Protection Agency, 1992, *Innovative Treatment Technologies: Semi-Annual Status Report,* 3rd. ed., EPA/540/2-91-001, U.S. Environmental Protection Agency, Office of Solid Waste and Emergency Response, Washington, D.C., incorporated herein in its entirety. The U.S. Environmental Protection Agency (EPA) has raised concerns about the use of ISV of arsenic and mercury sludges. See, Jacobson, L. S., and C. E. Mears, 1991, *U.S. EPA Concerns with In Situ Vitrification of Arsenic/Mercury Sludges,* Site Assessment/Remediation, 97–100, incorporated herein in its entirety. The concerns identified by EPA include the following:

Depth limitations of the process will leave the deeper soils contaminated with arsenic untreated in the settling basins.

Secondary waste generation, volatilization of 12% to 20% of the approximately 220 tons of arsenic and virtually all of the 26 tons of mercury at the site.

Characterization of site soils to ensure formation of a stable glass.

Vaporization of semiconfined water.

Air monitoring to ensure hood performance and protection of human health and the environment.

Attainment of Toxic Characteristic Leach Procedure (TCLP) regulatory levels.

Removal/closure of existing aboveground tanks and underground piping and utilities to eliminate preferential pathways for hot gas migration.

Cost, predicted to be approximately $1,200/yd$^3$.

In contrast to in situ methods, the in-furnace vitrification of this invention provides complete decontamination of the site. In-furnace vitrification essentially eliminates all the EPA concerns involving ISV:

Deep soil will be treated as needed.

All the volatilized arsenic, mercury and other possible constituents will be collected in the off-gas system, which will be recycled to the melter to be immobilized in the glass eventually except that mercury will be recovered as pure metal to reduce cost.

Glass is uniform and is easily characterized.

There is no semiconfmed water.

Off-gases will be monitored.

There are no concerns for the under- or aboveground structure.

The cost with the five-fold reduction in the waste volume will be significantly lower than ISV.

Vitrification is the only technology that produces a stable and nondegradable product, which is similar to some natural glasses which have survived for millions of years. Vitrification is the only technology generally applicable to many kinds of wastes, such as contaminated soil, sludge, loaded adsorption materials (activated alumina, iron oxyhydroxides, aluminum oxyhydroxide, etc.), ion exchange materials (both organic- and inorganic-based), fly ash, etc. The destruction of organics by vitrification can be in excess of 99.9999%.

The research and development of vitrification techniques for the immobilization of high-level nuclear waste glass has been carried out for the past several decades. This has resulted in the development of the in-furnace-melting batch process and the continuous ceramic melter (also called the Joule-heated melter). Borosilicate glass has been selected because of its low leachability, low viscosity at temperature of formation and consequent high retention of volatile species during vitrification. The personnel in the Nuclear Waste Glass Program of the Chemical Technology Division of Argonne National Laboratory have long been actively involved in the formulation, optimization and long-term durability testing of the nuclear waste glasses for the past decade. See, Feng, X., R. Adiga, A. Barkatt, and P. B. Macedo, 1986, *Effects of Composition on the Leach Behavior of West Valley High Level HLW Glasses,* Proc. Spectrum '86 Am. Nucl. Soc. Internat. Topical Meeting, 935–941, incorporated herein in its entirety. This experience with high level nuclear waste glasses are directly applicable to the inventive method described herein. The concepts and principles of these techniques will be understood by those skilled in the art as applicable to the use of the present invention and are to be considered as part of the methods of this invention.

DETAILED DESCRIPTION OF AN EMBODIMENT OF THE INVENTION

As described above, the method and/or integrated process of the present invention provides important advantages over those of the prior art. First, costly excavation of the contaminated soil is avoided. Second, arsenic contaminants of varying oxidation states are flushed out of the soil and can then be solidified/stabilized or vitrified in-furnace avoiding problems associated with in situ (subsurface) vitrification.

Figure 5:
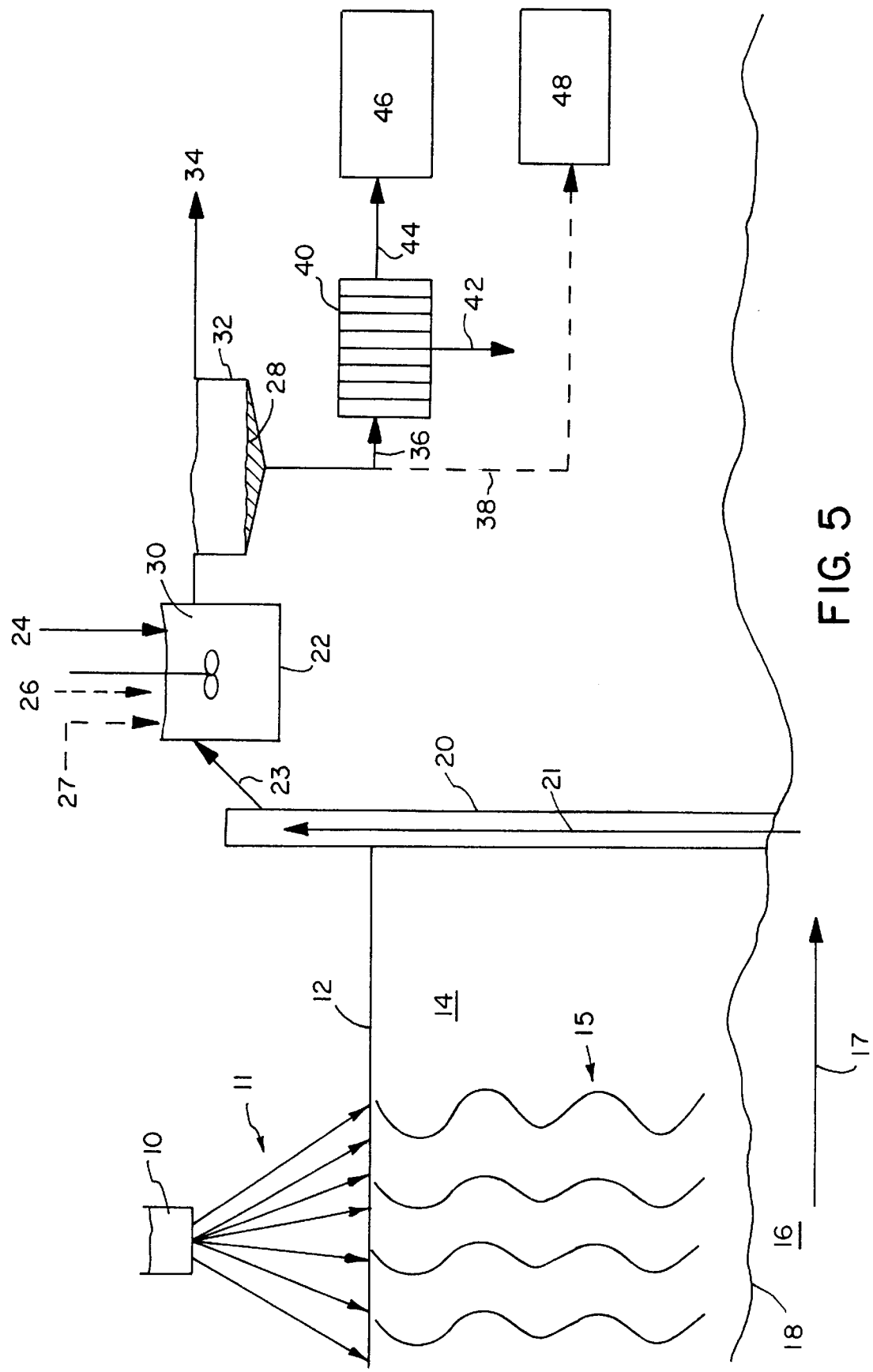
FIG. 5 is a schematic representation illustrating an integrated method in accordance with the present invention.

An embodiment of the method of the present invention is depicted in FIG. 5. A chelant, surfactant, or other extractant of the type described above 10 is applied to surface 12 of contaminated soil 14, for example by spraying injection lines or pipes or other such application techniques, as shown by arrows 11. The extractant may comprise ethylenediaminetetraacetic acid (EDTA), citric acid, oxalic acid, diethylentriaminepentaacetic acid (DTPA), or nitrolotriacetic acid (NTA) in addition to other extractants of the type described herein. Extractant 10 so applied percolates either passively or by way of any active mechanism known to those of skill in the art, through contaminated soil 14, as shown by arrows 15, flushing and/or removing arsenic-type contaminants from soil matrix 14 into groundwater 16 in water table 18 below. This aspect of the inventive method can be employed with a variety of soil types, and, impressive results are achievable with sandy and loam soil.

Production well 20 is established, connecting the subsurface and/or water table 18 to surface 12 at a point adjacent to surface 12 or downstream of the groundwater flow, shown by arrow 17. Groundwater 16, laden with one or more arsenic compounds is pumped from table 18 to surface 12 via well 20, as shown by arrow 21, optionally while monitoring arsenic concentrations to determine optimum application and/or flow conditions. At the surface, groundwater 16 is deposited in reactor 22, as shown by arrow 23. The extraction/removal aspects can be repeated as necessary until groundwater 16 pumped to surface 12 is substantially free of arsenic contamination.

On-site treatment in reactor 22 includes the addition of iron or aluminum salts 24, such as aluminum sulfate, ferrous sulfate, ferric sulfate and ferric chloride at concentrations sufficient to bring the arsenic contaminants out of solution. As described above, iron or aluminum oxyhydroxides can form in the reactor along with ferric or aluminum arsenate. Remaining unbound arsenate can sorb to the surface of an oxymetal hydroxide. Where at least a portion of the arsenic contaminant is present as an arsenite, hydrogen peroxide, potassium permanganate, or similar oxidizing agent are known to those skilled in the art can be added in an amount sufficient to convert arsenite to arsenate. Addition of a pH modifier 27 such as any suitable acid or base, may be necessary to achieve a pH$\leq$7 for removal of the arsenic, present mainly as arsenate.

From reactor 22, reaction mixture 30 is transferred to clarifier 32 where sludge 28 is allowed to settle and clarified effluent 34 is removed. The groundwater portion of effluent 34 may be subsequently treated and/or purified and returned to water table 18. Further processing of sludge 28, which contains the arsenic contamininants, can then proceed, such as shown by arrows 36 and 38.

Sludge 28 may undergo further solid/liquid separation, for example, as shown in filter press 40. Following removal of additional effluent, as shown by arrow 42, the remaining contaminant solids may be solidified/stabilized, on-site or elsewhere, with cement- or lime-based composites, thermoplastic, or organic polymers, or other stabilizing materials known to those skilled in the art as shown by arrow 44. Final disposal form 46 so produced represents significant improvement in volume reduction, over previous soil remediation methods.

Sludge 28 can be vitrified into glass in furnace 48, either on-site or elsewhere. In-furnace vitrification has been shown to have significant advantages over in situ vitrification of contaminated soils. As demonstrated, 80% of a contaminated soil medium first washed through chemical extraction and physical separation can be returned to the site as clean soil. The remaining 20% of the soil, contaminated with radioactive materials and heavy metals with organics, can be vitrified, resulting in a five-fold reduction in waste mass and energy consumption over in situ vitrification. In-furnace vitrification provides complete decontamination of a site while in situ methods require long-term monitoring and care of the vitrified subsurface. Vitrification produces a stable and nondegradable product, similar to natural glasses which have existed without breakdown for millions of years.

Equipment, instrumentation, and/or physical plant facilities useful in conjunction with the present methods are known and available to those skilled in the art made aware of this invention.

EXAMPLES OF THE INVENTION

The following non-limiting examples illustrate these and other features of the present invention.

As well-known to those skilled in the art, in the extraction and/or mobilization of arsenic compounds is simulated through employment of batch-shaker techniques.

Examples 1–3

Batch studies were performed using used chelating agents and surfactants as extractants for the purpose of evaluating the efficacy of each in mobilizing arsenite/arsenate (As) from selected industrial soil samples. As noted above, reference to any one extractant/agent as chelating, coordinating, mobilizing or with respect to any one mechanism of removal does not limit the present invention to any one mode of function or operation. Potential extractants investigated include:

pH-adjusted water

Sodium carbonate ($Na_2CO_3$)

Potassium phosphate dibasic ($K_2HPO_4$)

Citric acid (Cit)

Oxalic acid (Oxalate)

Phosphoric acid ($H_3PO_4$)

Triethylamine (TEA)

Polysodium vinyl sulfonate (PSVS), and three anionic and/or nonanionic surfactants commercially available from the Witco Company of New York, N.Y., under the Witconol 1206, Witcolate 100, and Witcodet D5-10 tradenames The batch extractions were performed in plastic containers with lids, agitated on a shaker table for 3-h, nominally using 5 grams of contaminated soil mixed with 45 mL of aqueous extraction solution. The concentration of the agents was approximately 0.01M, while the surfactant concentrations were nominally 1.0%. The extractions were all performed at room temperature (~23° C.). The pH range was varied, nominally in the range of 3 to 10.

Refer to FIGS. 1A–B, 2A–B and 3A–B for the percentage of arsenic extracted from three soils from different industrial sites (identified as soils S1, S2 and S3, respectively) using the various extractants. The initial arsenic concentrations in soil S1, S2 and S3 were 1860, 125 and 1340 mg As/kg soil, respectively. Table 1, below, summarizes the As removal efficiencies (over the entire pH range of 3 to 10) for these three soils. The overall effectiveness of the extracting agents for each soil is indicated below:

Example 1/Soil S1: Oxalate>$H_3PO_4$>Cit>PSVS>$Na_2CO_3$>$K_2HPO_4$>TEA~Wit 1206>$H_2O$~Wit 100 ~Wit D5-10

Example 2/Soil S2: PSVS>Wit 1206>$H_3PO_4$>Wit 100~TEA>Cit~Oxalate>>$K_2HPO_4$>$Na_2CO_3$>$H_2O$~Wit D5-10

Example 3/Soil S3: $H_3PO_4$~Oxalate>$Na_2CO_3$>PSVS~Cit>>Wit 100>$K_2HPO_4$~Wit 1206>TEA~Wit D5-10

FIGS. 1A–3B and the above summarized data indicate that oxalic acid, phosphoric acid, citric acid and polyvinylsulfonic acid, and/or their conjugate bases, are all effective at removing arsenic from soil. Sodium carbonate, potassium phosphate dibasic, the three surfactants and pH-adjusted water were less effective but can be used advantageously for arsenic removal. The removal of As was observed to be moderately pH-dependent for the following extracting agents: citric acid, potassium phosphate dibasic, oxalic acid, polyvinylsulfonic acid and their respective conjugate acids or bases, as well as for Witconol 1206, and Witcodet 100. Citric acid and/or citrate anion was found effective at pH≦8. Other agents analyzed, including EDTA and DTPA, were relatively pH independent.

TABLE 1

| | Site S1 | | Site S2 | | Site S3 | |
|---|---|---|---|---|---|---|
| | Initial As Concentration in Soil, (mg/kg) | | | | | |
| | 1860 | | 125 | | 1340 | |
| | As Removal Efficiency, (%) | | | | | |
| Extractant | Range | Mean | Range | Mean | Range | Mean |
| $H_2O$ | 1.21–6.84 | 3.86 | 7.28–15.56 | 12.34 | 4.20–16.38 | 9.72 |
| Citrate | 17.75–33.57 | 25.47 | 22.22–98.13 | 50.27 | 29.31–56.33 | 41.48 |
| Triethylamine | 5.87–13.17 | 9.05 | 45.40–61.28 | 54.20 | 7.28–20.04 | 12.04 |
| $Na_2CO_3$ | 7.40–27.73 | 14.67 | 15.43–17.19 | 16.38 | 30.15–64.11 | 45.33 |
| $K_2HPO_4$ | 7.51–16.79 | 10.79 | 10.62–40.19 | 20.27 | 8.11–38.11 | 19.23 |
| Oxalate | 13.05–53.96 | 34.32 | 25.23–~100 | 49.72 | 23.60–79.12 | 53.77 |
| $H_3PO_4$ | 20.28–41.45 | 28.15 | 53.33–84.11 | 67.35 | 36.04–85.34 | 54.61 |
| PSVS | 10.74–23.48 | 16.04 | 96.81–~100 | 99.36 | 19.01–99.94 | 43.75 |
| Witconol 1206 | 5.35–12.30 | 8.94 | 32.60–~100 | 83.36 | 8.87–35.96 | 17.82 |
| Witcodet 100 | 0.48–5.39 | 3.40 | 20.54–97.17 | 55.01 | 15.68–32.69 | 6.23 |
| Witcolate D5-10 | 0.48–2.99 | 1.74 | 6.99–29.03 | 11.46 | 2.57–18.44 | 5.85 |

Figure 4:
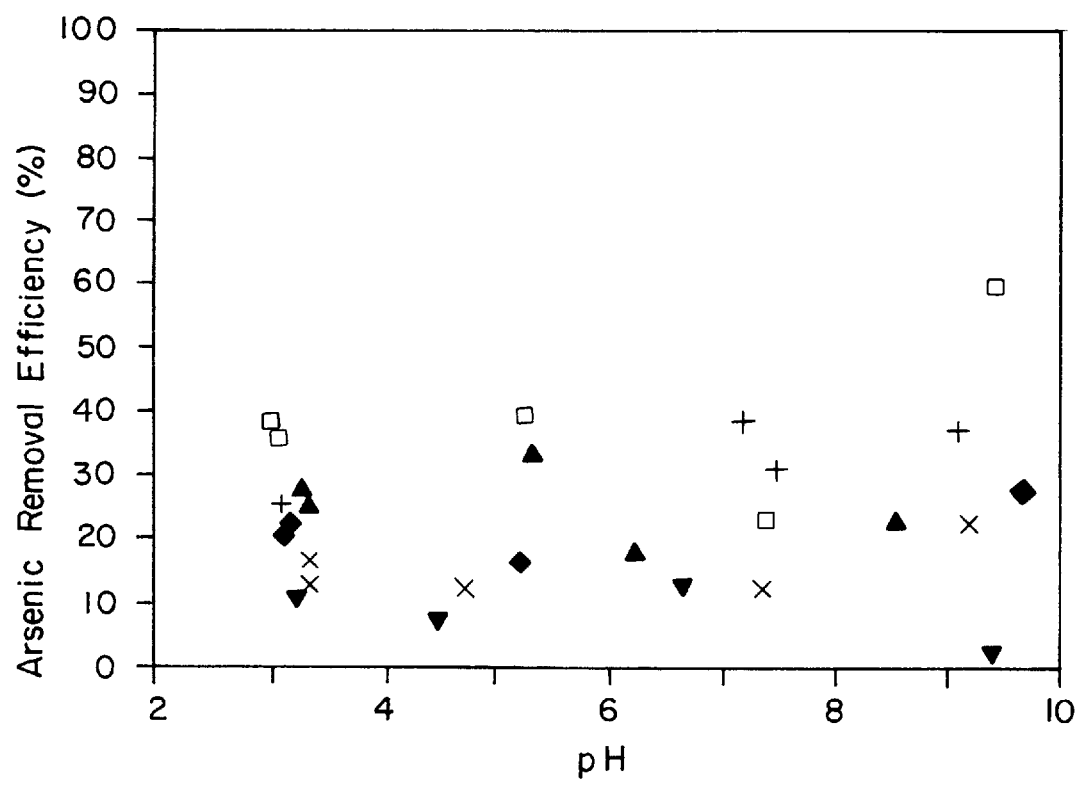
FIG. 4 illustrates the effect over a pH range of varying the solution concentration (M) of citric acid on arsenic removal efficiency (%), using soil sample 1, S1 (+0.05M, ♦0.02M, ▲0.01M, □0.10M, x0.005M, and ▼0.001M)

FIG. 4 shows the effect of varying the applied dosage of citric acid on the removal efficiency of As from the S1 soil. The efficiency increases as the concentration of citric acid increases, especially so for citric acid concentrations of 0.01M or greater.

Example 4

Based upon the results summarized in FIG. 4, citric acid was subjected to extended columnar extractions studies and applied in a preliminary field demonstration. The results from the field demonstration indicated a 100-fold increase in the As concentration for the first few pore volumes (entering the groundwater system).

While the principles of this invention have been described in connection with specific embodiments, it should be understood clearly that these descriptions are made only by way of example and are not intended to limit the scope of the invention, in any manner. Other advantages and features of the invention will become apparent from the claims hereinafter, with the scope of the claims determined by the reasonable equivalents as understood by those skilled in the art.

We claim:

1. A method for remediating an arsenic-contaminated soil medium without excavating the soil, comprising:
   contacting the soil medium with an aqueous extractant solution, wherein said extractant is selected from the group consisting of oxalic acid, oxalate anion, phosphoric acid, phosphate anion, citric acid, citrate anion, polyvinylsulfonic acid, polyvinylsulfonate anion and combinations thereof;
   directing said extractant solution through the soil medium;
   extracting at least one arsenic contaminant from the soil medium into said extractant solution; and
   collecting said extractant solution and said arsenic contaminant.

2. The method of claim 1 wherein said extractant solution has an extractant concentration of about 0.005–0.1M.

3. The method of claim 1 wherein said extractant solution has a pH of about 3–10.

4. The method of claim 1 wherein said extractant is selected from the group consisting of citric acid citrate anion and a combination thereof.

5. The method of claim 1 wherein said arsenic contaminant comprises at least one of inorganic arsenate, inorganic arsenite and organic arsenic.

6. An in situ method for extracting arsenic contaminants from a soil matrix, which comprises mobilizing at least one arsenic contaminant through interaction with a solution of an extractant, wherein said extractant is selected from the group consisting of citric acid, citrate anion and a combination thereof, extracting said contaminant into said extractant solution and collecting said arsenic contaminant and said extractant solution.

7. The in situ method of claim 6 wherein said arsenic contaminant is at least one of inorganic arsenate, inorganic arsenite and organic arsenic.

8. The in situ method of claim 7 wherein said solution has an extractant concentration of about 0.005–0.1M and a pH of about 3–10.

9. The in situ method of claim 6 wherein said at least one arsenic contaminant and said extractant solution are collected from a groundwater source below the soil matrix.

10. A method of in-place remediation of soil containing one or more arsenic compounds, comprising:
   contacting the soil with an extractant solution to mobilize the arsenic compounds, wherein said extractant is selected from the group consisting of oxalic acid, oxalate anion, phosphoric acid, phosphate anion, citric acid, citrate anion, polyvinylsulfonic acid, polyvinylsulfonate anion and combinations thereof;
   extracting the arsenic compounds into said extractant solution;
   directing said extractant solution through the soil and into a groundwater source below the soil;
   transferring the groundwater to a surface of the soil, the groundwater containing arsenic compounds and said extractant solution;

consolidating the arsenic compounds contained within said transferred groundwater; and stabilizing said consolidated arsenic compounds to minimize leaching during storage.

11. The method according to claim 10 wherein an arsenite component of the arsenic compounds is oxidizable to arsenate.

12. The method according to claim 10 wherein the arsenic compounds are consolidated as water insoluble precipitates.

13. The method according to claim 12 wherein said precipitates are formed with an iron or aluminum precipitating agent.

14. The method according to claim 13 wherein said precipitates are ferric arsenate or aluminum arsenate.

15. The method according to claim 12 wherein said arsenic compounds are sorbed by an oxymetal hydroxide, wherein said oxymetal hydroxide is hydrous ferric hydroxide or hydrous aluminum hydroxide.

16. The method according to claim 10, wherein said stabilizing comprises solidification or vitrification.

17. The method according to claim 10 wherein said extractant is selected from the group consisting of citric acid, citrate anion and a combination thereof.

18. The method according to claim 10 wherein said solution has an extractant concentration of about 0.005–0.1M and a pH of about 3–10.

19. The method according to claim 10 wherein said remediation is continuous.

* * * * *